United States Patent
Ogawa et al.

(10) Patent No.: US 11,400,373 B2
(45) Date of Patent: Aug. 2, 2022

(54) INFORMATION PROCESSING SYSTEM AND INFORMATION PROCESSING METHOD

(71) Applicant: BLACK INC., Tokyo (JP)

(72) Inventors: Futa Ogawa, Tokyo (JP); Akihiro Tamada, Tokyo (JP); Daiki Minakawa, Tokyo (JP); Junya Ochiai, Tokyo (JP); Takuya Sakurai, Tokyo (JP)

(73) Assignee: BLACK INC., Tokyo (JP)

( * ) Notice: Subject to any disclaimer, the term of this patent is extended or adjusted under 35 U.S.C. 154(b) by 0 days.

(21) Appl. No.: 17/311,983

(22) PCT Filed: Aug. 24, 2020

(86) PCT No.: PCT/JP2020/031750
§ 371 (c)(1),
(2) Date: Jun. 8, 2021

(87) PCT Pub. No.: WO2021/039680
PCT Pub. Date: Mar. 4, 2021

(65) Prior Publication Data
US 2022/0001281 A1    Jan. 6, 2022

(30) Foreign Application Priority Data

Aug. 26, 2019 (JP) .............................. JP2019-154154

(51) Int. Cl.
*A63F 13/533* (2014.01)
*A63F 13/2145* (2014.01)
(Continued)

(52) U.S. Cl.
CPC ........ *A63F 13/533* (2014.09); *A63F 13/2145* (2014.09); *A63F 13/22* (2014.09);
(Continued)

(58) Field of Classification Search
CPC .... A63F 13/533; A63F 13/2145; A63F 13/22; A63F 2300/1018; G06F 3/0483;
(Continued)

(56) References Cited

U.S. PATENT DOCUMENTS

2008/0068290 A1* 3/2008 Muklashy ............ G06F 3/1423
345/2.1
2012/0089703 A1 4/2012 Watariuchi
(Continued)

FOREIGN PATENT DOCUMENTS

CN  102547014 A  7/2012
CN  103312928 A  9/2013
(Continued)

OTHER PUBLICATIONS

Decision to Grant a Patent for JP 2019-154154 dated Nov. 19, 2019 (6 pages).
(Continued)

*Primary Examiner* — Yingchuan Zhang
(74) *Attorney, Agent, or Firm* — Foley & Lardner LLP

(57) ABSTRACT

An information processing system (100) includes: an event-information processing unit (130) for converting event information generated by operation on a browser of the user terminal into information specified by software executed on a computer communicable with the user terminal (900); and an information input unit (140) inputting the information converted by the event-information processing unit (130) to the software.

20 Claims, 8 Drawing Sheets

(51) Int. Cl.

| | | |
|---|---|---|
| *A63F 13/22* | (2014.01) | |
| *G06F 3/0483* | (2013.01) | |
| *G06F 3/0484* | (2022.01) | |
| *G06F 3/04883* | (2022.01) | |
| *G06F 3/14* | (2006.01) | |
| *H04L 67/025* | (2022.01) | |
| *H04L 67/131* | (2022.01) | |

(52) U.S. Cl.
CPC .......... *G06F 3/0483* (2013.01); *G06F 3/0484* (2013.01); *G06F 3/04883* (2013.01); *G06F 3/14* (2013.01); *H04L 67/025* (2013.01); *H04L 67/131* (2022.05); *A63F 2300/1018* (2013.01); *A63F 2300/1075* (2013.01); *A63F 2300/308* (2013.01)

(58) Field of Classification Search
CPC ........ G06F 3/0484; G06F 3/0488; G06F 3/14; H04L 67/025; H04L 67/38
See application file for complete search history.

(56) References Cited

U.S. PATENT DOCUMENTS

| | | | |
|---|---|---|---|
| 2012/0299846 A1 | 11/2012 | Matsuda | |
| 2013/0246509 A1 | 9/2013 | Sakiyama et al. | |
| 2015/0309694 A1 | 10/2015 | Nagao | |
| 2017/0354878 A1* | 12/2017 | Posin | .................... A63F 13/352 |
| 2019/0306561 A1* | 10/2019 | Xu | .................... H04N 21/47205 |

FOREIGN PATENT DOCUMENTS

| | | |
|---|---|---|
| CN | 105045417 A | 11/2015 |
| JP | H836479 | 2/1996 |
| JP | H09-274550 | 10/1997 |
| JP | H10-254530 | 9/1998 |
| JP | 2002-111893 | 4/2002 |
| JP | 2007-286825 | 11/2007 |
| JP | 2013-140589 | 7/2013 |
| JP | 2013-218517 | 10/2013 |
| JP | 2014-123243 | 7/2014 |
| JP | 2014-222481 | 11/2014 |
| JP | 2015-088131 | 5/2015 |
| JP | 2015-118425 | 6/2015 |
| JP | 2015-525085 | 9/2015 |
| JP | 2015-210714 | 11/2015 |
| JP | 2015-215765 | 12/2015 |
| JP | 2016-015150 | 1/2016 |
| JP | 2016-053969 | 4/2016 |
| JP | 2017-045426 | 3/2017 |
| JP | 2019-126714 | 8/2019 |
| WO | WO-2012/157014 A1 | 11/2012 |
| WO | WO-2013/175629 | 11/2013 |

OTHER PUBLICATIONS

Decision to Grant a Patent for JP 2019-212658 dated Mar. 16, 2020 (6 pages).
International Search Report and Written Opinion for PCT/JP2020/031750 dated Oct. 20, 2020 (10 pages).
Reasons for Refusal for JP 2019-154154 dated Sep. 10, 2019 (8 pages).
Reasons for Refusal for JP 2019-154154 dated Oct. 23, 2019 (10 pages).
Reasons for Refusal for JP 2019-212658 dated Dec. 24, 2019 (10 pages).
Reasons for Refusal for JP 2019-212658 dated Feb. 4, 2020 (10 pages).
Office Action dated Oct. 27, 2021 issued in a corresponding Chinese Patent Application No. 202080006810.1, (19 pages).

* cited by examiner

INFORMATION PROCESSING SYSTEM AND INFORMATION PROCESSING METHOD

CROSS-REFERENCE TO RELATED APPLICATIONS

This application is a U.S. National Stage Application under 35 U.S.C. § 371 of International Application No. PCT/JP2020/031750, filed Aug. 24, 2020, which claims the benefit of Japanese Application No. 2019-154154, filed Aug. 26, 2019, the contents of each of which are incorporated herein by reference in their entireties.

TECHNICAL FIELD

The present invention relates to, for example, an information processing system and an information processing method including a mechanism capable of remotely operating an application loaded on a computer connectable via a network from a user terminal.

BACKGROUND ART

Software executed by a computer is classified into a standalone application, a native application, a Web application, and the like.

The standalone application is executed by only an arithmetic unit of a computer on which the standalone application is loaded. The native application is an application of a type in which an arithmetic unit in a computer in which the native application is installed directly performs arithmetic processing. The standalone application and the native application are executed without always requiring a network environment. However, in the native application, communication is sometimes performed according to necessity in stages during the execution of the application (Following Patent Literature 1).

The Web application is an application of a type in which arithmetic processing concerning the application is performed in a server on a network. In the Web application, a user terminal used by a user who uses the application solely performs input and output concerning the Web application. A network environment connectable to a network is necessary for operation of the Web application (Following Patent Literature 2).

CITATION LIST

Patent Literature

Patent Literature 1: JP 2016-053969 A
Patent Literature 2: JP 2015-525085 A

SUMMARY

The standalone application or the native application are basically locally executed by a user terminal. Accordingly, executability of the standalone application or the native application depends on a type and a version of an operating system (OS) of the user terminal.

Accordingly, a developer of an application usually needs to manufacture applications of a plurality of versions according to types and versions of OSs in use. In particular, when the version of the OS of the user terminal is updated, effectiveness of the application of this type is not sometimes guaranteed.

It is also conceivable to convert an existing standalone application or native application into a type of the Web application. However, a manufacturing period and manufacturing cost are required for such conversion.

In view of the above background, there is a desire for a mechanism that can more generally execute existing software without depending on a type, a version, and the like of an OS as much as possible.

An information processing system in an aspect includes: an event-information processing unit converting event information generated by operation on a browser of the user terminal into information specified by software executed on a computer communicable with the user terminal; and an information input unit inputting the information converted by the event-information processing unit to the software.

An information processing system in another aspect is an information processing system including a computer that is capable of communicating with a user terminal and that executes software remotely operated from the user terminal, the information processing system including: an image processing unit that is configured to acquire an image of a window generated by the execution of the software; and an image distributing unit that is configured to display the image acquired by the image processing unit in a display region of a browser of the user terminal.

An information processing method in an aspect includes by a computer: an event-information processing step for converting event information generated by operation on a browser of a user terminal into information specified by software executed on a computer communicable with the user terminal; and an information input step for inputting the information converted by the event-information processing step to the software.

An information processing method in an aspect includes by a computer: an image processing step for acquiring an image of a window generated by execution of software which is remotely operated from a user terminal; and an image distributing step for displaying the image acquired by the image processing step in a display region of a browser of the user terminal.

A program in an aspect is a program for causing a computer to execute the information processing method explained above and/or a storage medium storing the program.

DESCRIPTION OF EMBODIMENTS

Figure 1:
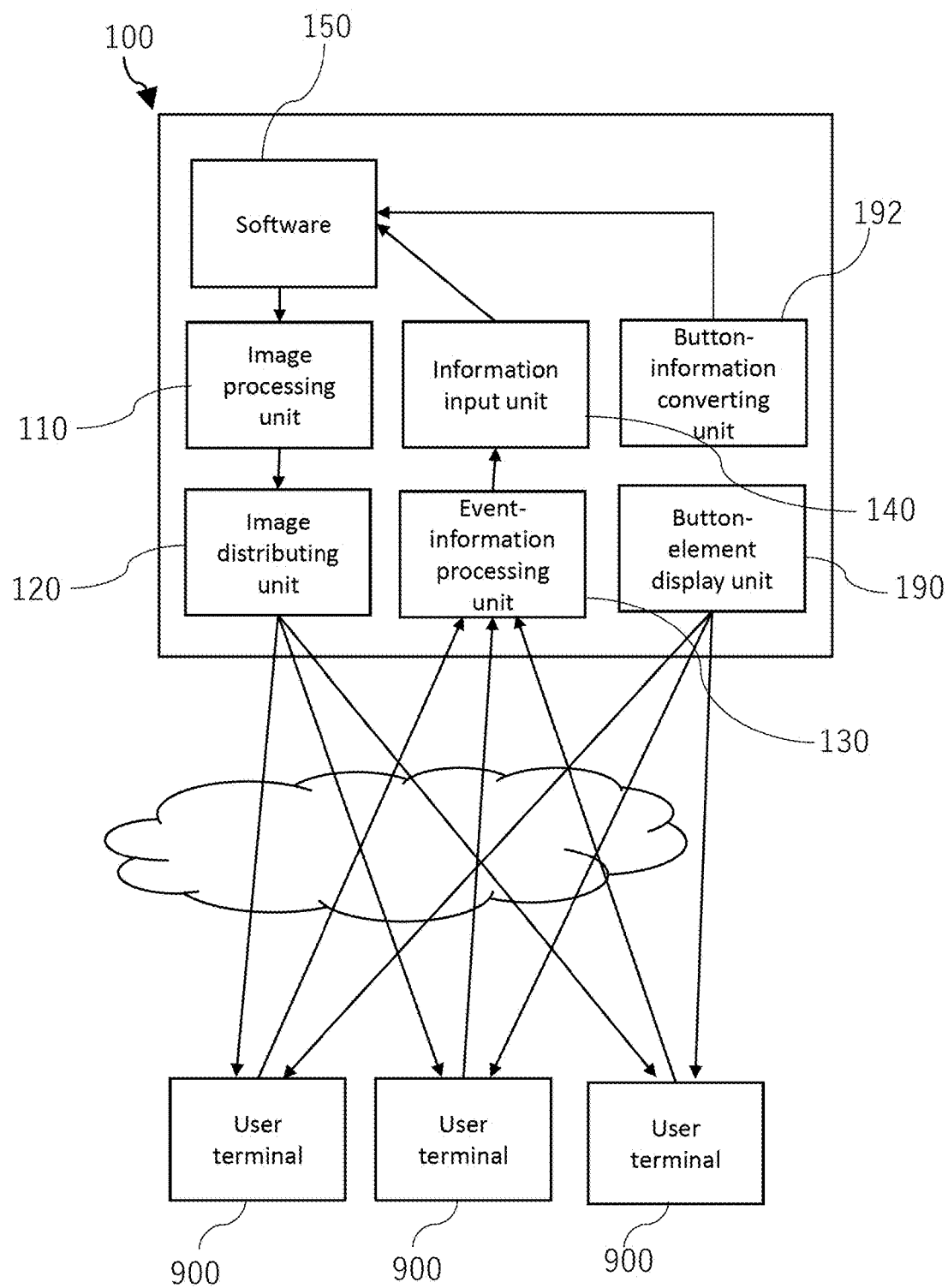
FIG. 1 is a block diagram illustrating the configuration of an information processing system in a first embodiment.

Embodiments are explained below with reference to the drawings. In the drawings referred to below, the same or similar portions are denoted by the same or similar reference numerals and signs.

First Embodiment

Figure 2:
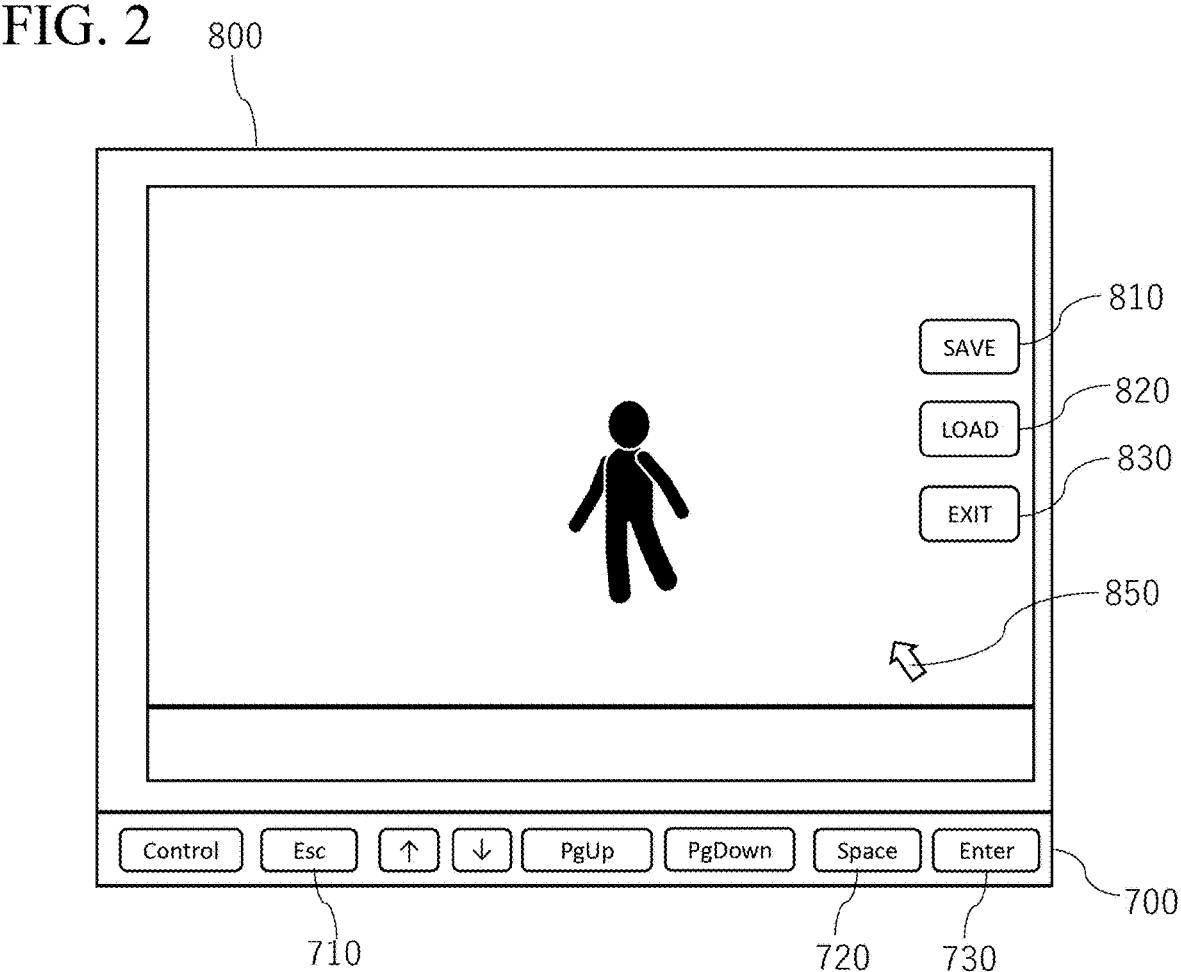
FIG. 2 is an example of a software window image displayed on a browser of a user terminal.

FIG. 1 is a block diagram illustrating the configuration of a computer system in a first embodiment. FIG. 2 is an example of a software window image displayed on a browser of a user terminal.

An information processing system 100 may include an image processing unit 110, an image distributing unit 120, an event-information processing unit 130, an information input unit 140, and installed software 150.

In FIG. 1, the information processing system 100 is drawn as including all of the image processing unit 110, the image distributing unit 120, the event-information processing unit 130, the information input unit 140, and the software 150. However, these components may be respectively provided in different computers. That is, the information processing system 100 may configure a distributed computer system.

A user terminal 900 is not particularly limited if the user terminal 900 is a computer connectable to a network. The user terminal 900 may be a personal computer, a portable terminal such as a smartphone, or the like.

The user terminal 900 is connectable to the information processing system 100 via the network. The information processing system 100 and the user terminal 900 can transmit and receive data each other through the network. The network may be various networks such as the Internet, an extra-network, or an intra-network (hereinafter simply referred to as "network").

The information processing system 100 is a computer capable of executing the software 150 loaded on the information processing system 100. One or a plurality of kinds of software may be loaded on the information processing system 100.

The software loaded on the information processing system 100 may be a standalone application, a native application, or an online application. Preferably, the software is the standalone application or the native application.

In particular, the software 150 may be originally operated on a computer on which the software 150 is loaded. In other words, the software may be originally software of a type installed in a computer directly operated by a user who uses the software. In this case, usually, when the software is executed, a software window (a window directly specified by the software) is displayed on a display connected to the computer in which the software is installed and operation specified by the software is executed on the software window by operation of a mouse, a touch panel, or the like.

However, in this embodiment, the software 150 installed in the computer configuring the information processing system 100 is operated from the user terminal 900 through the network. More specifically, the software 150 is operated from a browser of the user terminal 900 via the network. The browser of the user terminal 900 may be a Web browser.

The loaded software 150 may be, for example, game software. In this case, the user can remotely operate a game through the network from the Web browser of the user terminal 900. Consequently, the user can enjoy the gate on the Web browser.

When a plurality of kinds of software are loaded on the information processing system 100, the user preferably can select one of the plurality of kinds of software and execute the software from the Web browser of the user terminal 900.

The image distributing unit 120 distributes image information generated by the execution of the software 150 to the user terminal 900. That is, the image distributing unit 120 distributes, to the user terminal 900, an image of a window that should be normally displayed by the software 150 executed on the information processing system 100. Consequently, an image equivalent to the software window (hereinafter sometimes referred to as "software window image") is displayed on the Web browser of the user terminal 900. The "image" includes not only a still image but also a moving image such as a video.

As explained below, the software window image is defined by an image of a region acquired (captured) by the image processing unit 110. Preferably, the software window image is an image equivalent to a client region of the software window. The software window image is displayed in, for example, a display region specified by a video tag in the Web browser.

In general, the software window that should be displayed during the execution of the software includes items for realizing various kinds of operation on the window such as buttons and checkboxes. However, in this embodiment, the image distributing unit 120 basically distributes an image that should be displayed in the window to the user terminal 900 as image information (moving image information).

FIG. 2 is an example of a software window image displayed on a browser 800 of the user terminal 900. As illustrated in FIG. 2, an image is displayed on the Web browser 800 of the user terminal 900. Images of predetermined buttons 810, 820, and 830 are displayed in the image.

The image displayed on the Web browser 800 of the user is the image distributed as the image information (the moving image information). That is, even if images equivalent to the buttons 810, 820, and 830 are present in the software window image displayed on the Web browser of the user terminal 900, the images of the buttons 810, 820, and 830 do not have functions inherent in buttons.

The distribution of the image by the image distributing unit 120 can be executed by any publicly-known method. The image information (the moving image information) that should be distributed is preferably encoded by a predetermined method. The encoded image information is decoded by the user terminal 900. The image information is preferably resized according to a size of the Web browser 800 based on a ratio of the resolution of the Web browser 800 of the user terminal 900 and the resolution of the software window and the resized image is displayed on the Web browser. Consequently, the entire software window can be displayed on the Web browser 800 irrespective of a difference in the magnitude of the resolution on the Web browser 800 of the user terminal 900.

Event information generated by operation of an input device on the user terminal 900 side is transmitted to the event-information processing unit 130 via the network. The event-information processing unit 130 converts the event information received from the user terminal 900 according to a predetermined rule. The operation of the input device includes pointer operation, touch panel operation, keyboard operation, or the like.

Information converted by the event-information processing unit 130 is input to the software 150 through the information input unit 140. Consequently, the software 150 corresponding to a software window image being displayed on the Web browser of the user terminal 900 is remotely operated based on the event information sent from the user terminal 900.

The pointer operation may be, for example, operation of a pointer by a mouse or a touch panel but is not limited to this. The pointer operation includes movement of a pointer position or click operation or tap operation of the pointer in a predetermined position.

The touch panel operation is executable when the user terminal 900 has a touch panel function. The touch panel operation may be swipe operation, tap operation, or the like.

Event information generated by the pointer operation or the touch panel operation may include position information (position coordinates) for specifying a position of a pointer or a touch position. The position information is usually formed by a position coordinates on a screen of the user terminal 900 or a position coordinates on the Web browser 800 of the user terminal 900. Therefore, the position coordinates are usually specified by two-dimensional numbers.

In this embodiment, the event-information processing unit 130 acquires position coordinates of a pointer position or a touch position on the Web browser used by the user terminal 900. The event information generated on the Web browser 800 of the user terminal 900 sometimes cannot be input to the software 150 of the information processing system 100 in an unchanged form.

For example, position coordinates on the Web browser 800 of the user terminal 900 are not the same as position coordinates on the software window. This is because the resolution of the Web browser 800 of the user terminal 900 is different from the resolution of a window specified by the software 150.

(Conversion of Position Coordinates)

In the following explanation, a specific example of a flow of processing of event information from the user terminal 900 is explained.

First, the event-information processing unit 130 receives event information from the user terminal 900. The event information is, for example, information generated by pointer operation or touch operation.

The event information may be periodically received at a predetermined time interval. In this case, the event-information processing unit 130 may periodically receive the event information, for example, at an interval of approximately 0.01 seconds to 1.00 seconds. Alternatively, the event-information processing unit 130 may receive the event information when an event occurs. In this case, the occurrence of the event may be, for example, a click operation of a pointer or a touch operation of a touch panel.

The event information generated by the pointer operation or the touch operation may include position coordinates (dux, duy) of a pointer position or a touch position. The user terminal 900 converts, according to necessity, the position coordinates (dux, duy) into standardized position coordinates which is obtained by dividing the position coordinates (dux, duy) by resolution (DUx, DUy) on the Web browser. Consequently, the position coordinates of the pointer position and the touch position is standardized (dux/DUx, duy/DUy) into a value which is not depending on the magnitude of the resolution of the Web browser 800.

First, the event-information processing unit 130 receives the standardized position coordinates from the user terminal 900 as event information.

Subsequently, the event-information processing unit 130 converts the standardized position coordinates into position coordinates on the window based on resolution (DEx, DEy) of the software window.

Specifically, the event-information processing unit 130 multiplies the standardized position coordinates (dux/DUx, duy/DUy) by the resolution (DEx, DEy) of the software window. Consequently, position coordinates (dux*DEx/DUx, duy*DEy/DUy) on the software window is obtained.

Subsequently, the information input unit 140 inputs the position coordinates (dux*DEx/DUx, duy*DEy/DUy) converted by the event-information processing unit 130 to the software 150. Consequently, the software 150 advances processing of the software 150 assuming that an event occurs in the position coordinates (dux*DEx/DUx, duy*DEy/DUy) after the conversion.

As explained above, the event-information processing unit 130 converts the position coordinates on the Web browser 800 of the user terminal 900 into position coordinates concerning the software window based on a ratio of the resolution of the Web browser 800 and the resolution of the soft window. Consequently, even if deviation occurs in coordinates of an event occurrence position of a pointer, a touch, or the like according to a difference in the resolution between the Web browser 800 and the software window of the user terminal 900, the event-information processing unit 130 can correct the position coordinates deviation.

More specifically, the event-information processing unit 130 converts the position coordinates on the Web browser 800 of the user terminal 900 into position information concerning the software window according to a ratio of resize of image information distributed to the user terminal 900. Consequently, a specific position in an image displayed on the Web browser 800 of the user terminal 900 coincides with a corresponding position in the software window.

Figure 3:
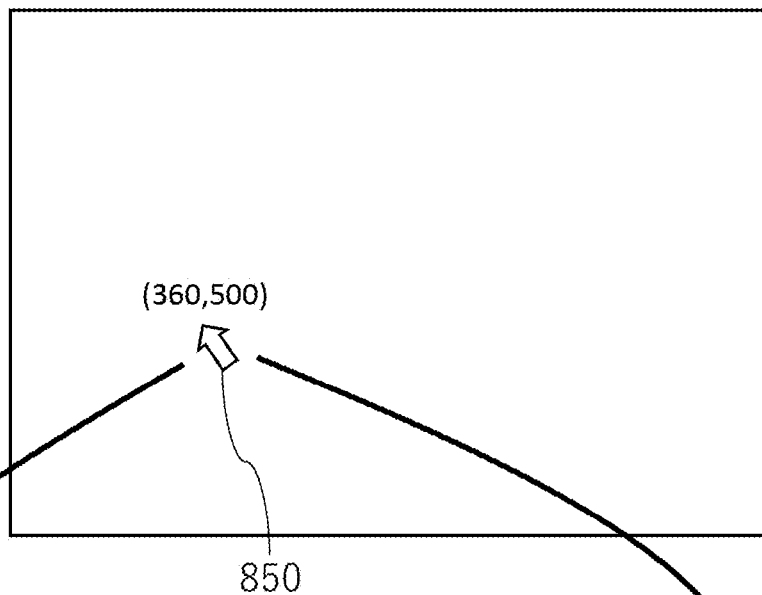
FIG. 3 is a diagram for explaining an example of information processing of an event-information processing unit.
Figure 3:
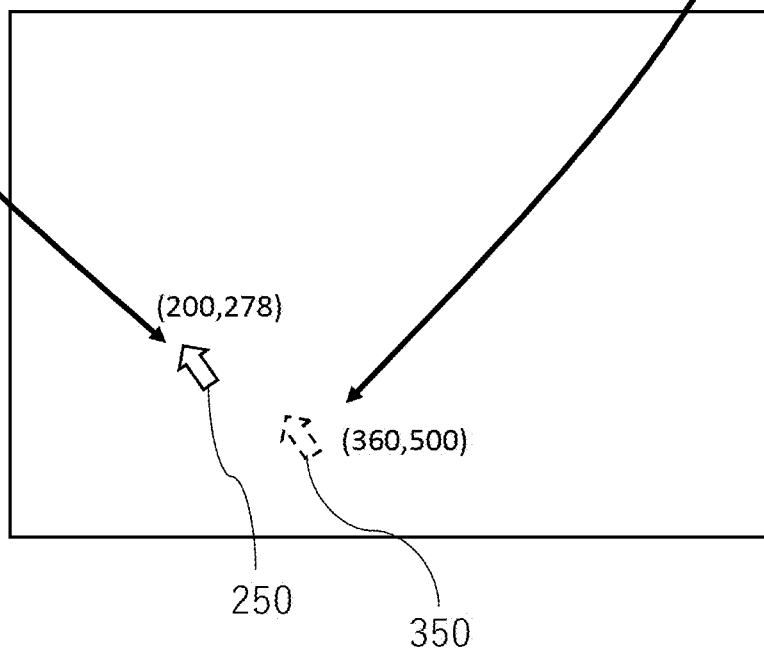

An example of the event-information processing unit 130 is explained with reference to FIG. 3. In FIG. 3, the resolution of the Web browser 800 of the user terminal 900 is (1440, 1080). On the other hand, the resolution of the software window is (800, 600).

It is assumed that a pointer 850 is clicked in specific position coordinates, for example, (360, 500) on the Web browser 800 in the user terminal 900. In this case, the event-information processing unit 130 receives standardized position coordinates (360/1440, 500/1080) from the user terminal 900.

The event-information processing unit 130 multiplies the standardized position coordinates (360/1440, 500/1080) by the resolution (800, 600) of the software window. Consequently, the event-information processing unit 130 generates converted position coordinates (360*800/1440, 500*600/1080). Consequently, a position 850 of the pointer on the Web browser 800 is mapped to position coordinates (200, 278) on the software window (a position of a sign 250 in the figure). Note that, if the conversion of the position coordinates by the event-information processing unit 130 is not performed, as illustrated in FIG. 3, the position coordinates on the Web browser could indicate completely different position coordinates (360, 500) on the software window (the position of a sign 350 in the figure).

As explained above, the information input unit 140 inputs, to the software 150, information to the effect that the event occurs in the position coordinates converted by the event-information processing unit 130. Therefore, when the user performs click operation or touch operation of the pointer in the positions of the images 810, 820, and 830 of the buttons displayed on the Web browser 800, the software 150 recognizes that click or touch is performed in the positions of the buttons of the software window.

Consequently, the software starts the same processing as processing performed when the buttons are clicked or touched. In this way, the user can operate the software 150 remotely from the Web browser 800 of the user terminal 900.

In the example explained above, the position information generated by the click operation of the pointer or the touch operation of the touch panel is explained. Without being limited to this, the event-information processing unit 130 may convert information concerning the position coordinates on the Web browser 800 acquired from the user terminal 900 into corresponding position coordinates on the software window using the same method. The information input unit 140 may input, to the software 150, information to the effect that an event occurs in the position coordinates converted by the event-information processing unit 130.

Examples of event information from which such position coordinates are generated include event information generated by pointer operation, click operation (for example, left click or right click), double click operation, and long press operation of a mouse and touch operation, swipe operation, and long press operation of a touch panel.

In the example of the conversion of the position coordinates explained above, first, the user terminal 900 executes the processing for generating the standardized position coordinates (dux/DUx, duy/DUy). The processing is not essential processing and may be executed according to necessity. For example, if the standardized position coordinates are sent from the user terminal 900 to the event processing unit 130 together with the resolution (DUx, DUy) of the Web browser, the position coordinates (dux*DEx/DUx, duy*DEy/DUy) after the conversion that should be finally generated can be generated by the event-information processing unit 130.

The position coordinate on the Web browser (the browser) explained above may be a coordinate specified with the origin (0, 0) of the browser set as an origin or may be a coordinate specified with the origin (0, 0) of the display region on the browser set as an origin. However, when the origin of a coordinate system of the position coordinates acquired by the event-information processing unit 130 deviates from the origin of the software window specified by the software 150, processing for matching the origins may be executed before or after the ratio processing based on the resolution explained above.

(Processing of ON Information and OFF Information Included in Event Information)

Subsequently, an example of processing of ON information and OFF information included in event information is explained.

The event-information processing unit 130 receives event information from the user terminal 900. In this example, the event information is, for example, information generated by the click operation of the pointer or the touch operation of the touch panel. The event information generated by these kinds of operation includes position coordinates on the Web browser. Therefore, the position coordinates may be converted in the same manner as in the method explained above by the event-information processing unit 130.

In the following explanation, when the event-information processing unit 130 periodically receives event information at a predetermined time interval, processing for determining whether the pointer is clicked or the touch panel is touched is explained.

In this case, the user terminal 900 transmits, to the event-information processing unit 130, at a predetermined interval, ON information indicating that the pointer is clicked or the touch panel is touched and OFF information indicating that the pointer is not clicked or the touch panel is not touched. The predetermined interval may be an interval of approximately 0.01 seconds to 1.00 seconds.

Subsequently, when receiving the ON information for the first time after receiving the OFF information, the event-information processing unit 130 generates information corresponding to pressing the pointer or the touch panel. The information generated by the event-information processing unit 130 is input to the software 150 by the information input unit 140. The software 150 receives the information corresponding to the pressing the pointer or the touch panel and advances processing according to the input information.

In a period in which the ON information is continuously received, the event-information processing unit 130 does not generate the information corresponding to pressing/releasing the pointer or the touch panel. In other words, in the period in which the event-information processing unit 130 continuously receives the ON information, the software 150 does not receive information to the effect that the pointer or the touch panel is clicked or touched and does not advance processing by click or touch.

Similarly, when receiving the OFF information for the first time after receiving the ON information, the event-information processing unit 130 generates information to the effect that the click or the touch is released. In this way, when receiving the OFF information after receiving the ON information or when receiving the ON information after receiving the OFF information, the information input unit 140 preferably inputs, to the software 150, information indicating that operation of the input device is changed.

When the event-information processing unit 130 periodically receives event information at a predetermined time interval in a period in which the user presses or releases the pointer or the touch panel, the event-information processing unit 130 continuously receives the ON information or the OFF information. Therefore, when the event-information processing unit 130 sends, to the software 150, the information to the effect that the pointer or the touch panel is pressed or released at every time the event-information processing unit 130 receives the ON information or the OFF information, the software 150 could misrecognize that the pointer or the touch panel is pressed or released a plurality of times. In the form explained above, after the ON information is received, it is determined that the pointer or the touch panel is clicked or touched only once. Therefore, it is possible to prevent such misrecognition.

Instead of the processing explained above, the information input unit 140 may input the ON information or the OFF information received from the input device to the software 150 in an unchanged form. The processing of the ON information or the OFF information may be changed according to a type of the input device and the like.

When the event-information processing unit 130 receives neither the ON information nor the OFF information for predetermined seconds after receiving the ON information, the event-information processing unit 130 may regard that the OFF information is received and advances the processing. This could occur, for example, when the connection of the user terminal 900 is interrupted. In a situation in which the OFF information cannot be semi-permanently received in this way, the event-information processing unit 130 preferably performs processing of timeout without continuing the processing of the ON information.

The click operation or the touch operation is explained above. However, the processing explained above is not limited to the click operation or the touch operation if the operation by the ON information and the OFF information is performed in the same manner. The processing concerning the ON Information and the OFF information explained above can also be applied to operation such as drag & drop. That is, the processing explained above can be generally applied to operation performed using the input device that generates the event information including the ON information and the OFF information. Examples of such an input device include a mouse, a keyboard, and a touch panel but are not limited to these devices.

(Button Element Function)

The information processing apparatus 100 may include: a button-element display unit 190 that displays button elements linked with a programming language operating on the Web browser; and a button-information converting unit 192 that converts event information generated by operation of the button-element display unit into predetermined information.

In the example illustrated in FIG. 2, a plurality of button elements 710, 720 and 730 are displayed right below the software window image. The button elements 710, 720 and 730 are linked with a programming language operating on the Web browser, for example, JavaScript (registered trademark). Therefore, when the button elements 710, 720, and 730 are operated by click operation, tap operation, or the like, information to the effect that the button elements 710, 720, and 730 are operated is sent to the information processing apparatus 100.

Images (including characters) associated with any ones of buttons provided in an input device such as a keyboard are preferably displayed on the button elements 710, 720, and 730. In the example illustrate in FIG. 2, characters "Esc" are displayed on the button element 710. Characters "Space" are displayed on the button element 720. Further, characters "Enter" are displayed on the button element 730.

When the button elements 710, 720, and 730 are operated, the button-information converting unit 192 receives event information generated by operation of the button-element display unit, that is, information to the effect that the button elements 710, 720, and 730 are operated.

The button-information converting unit 192 converts the event information into an event signal generated by pressing of a predetermined button provided in the keyboard. The converted event signal is input to the software 150.

The button elements 710, 720, and 730 are associated with predetermined buttons provided in the keyboard. The button-information converting unit 192 converts event information generated by operation of the button element 710 into an event signal generated by pressing of a button of the keyboard corresponding to the button element 710.

Consequently, when the user operates the button elements 710, 720, and 730 on the browser, the software 150 regards that keyboard events corresponding to the button elements 710, 720, and 730 occur and advances processing of the keyboard events.

The button elements 710, 720, and 730 are associated with the buttons of the keyboard in the example explained above but are not limited to this. The button elements 710, 720, and 730 may be associated with input operation in any input device.

When the user terminal 900 includes any physical input device such as a keyboard, a signal from the input device may be sent to the information processing system 100. The button-information converting unit 192 may perform the same processing as the processing explained above on the signal sent to the information processing system 100 to make it possible to operate the software 150.

(Image Processing Unit)

Figure 4:
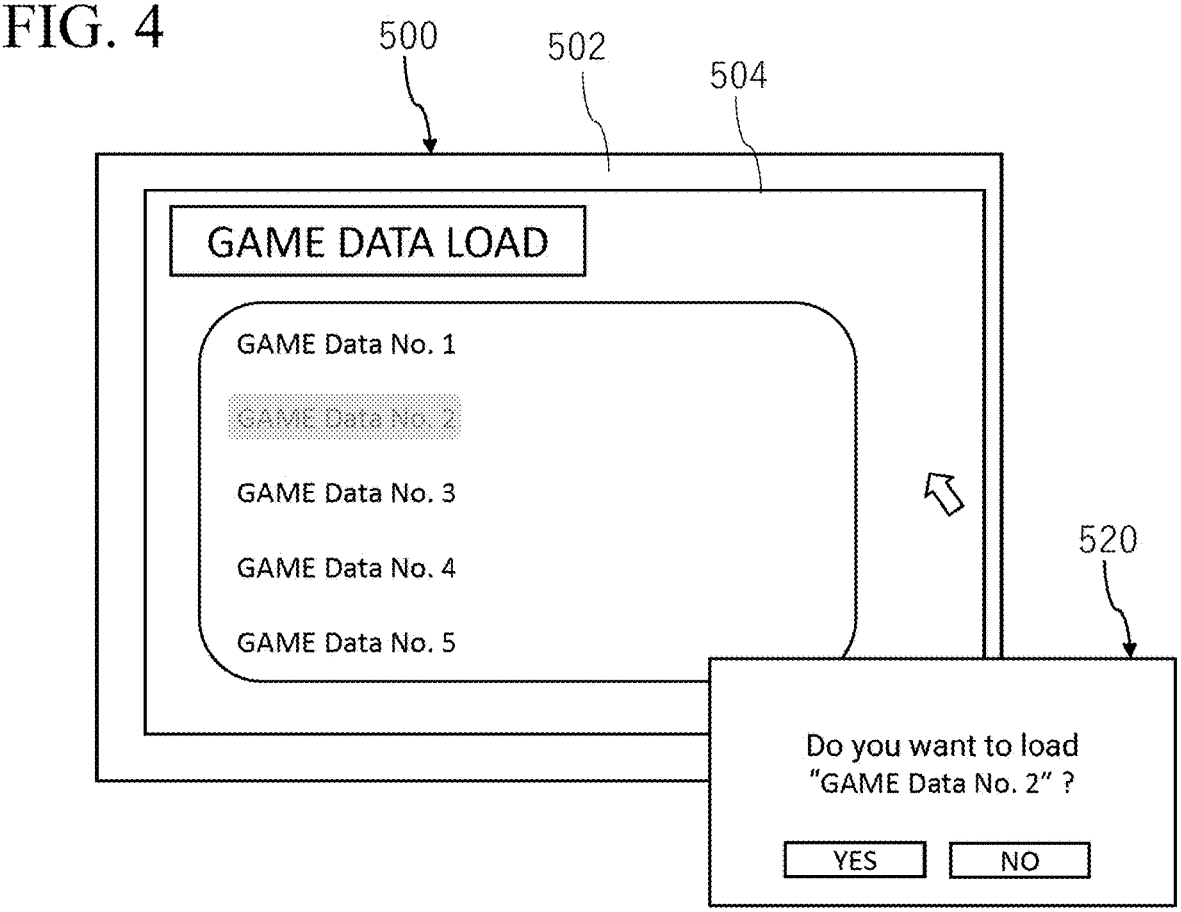
FIG. 4 is a schematic diagram illustrating original window display including a plurality of software windows.
Figure 5:
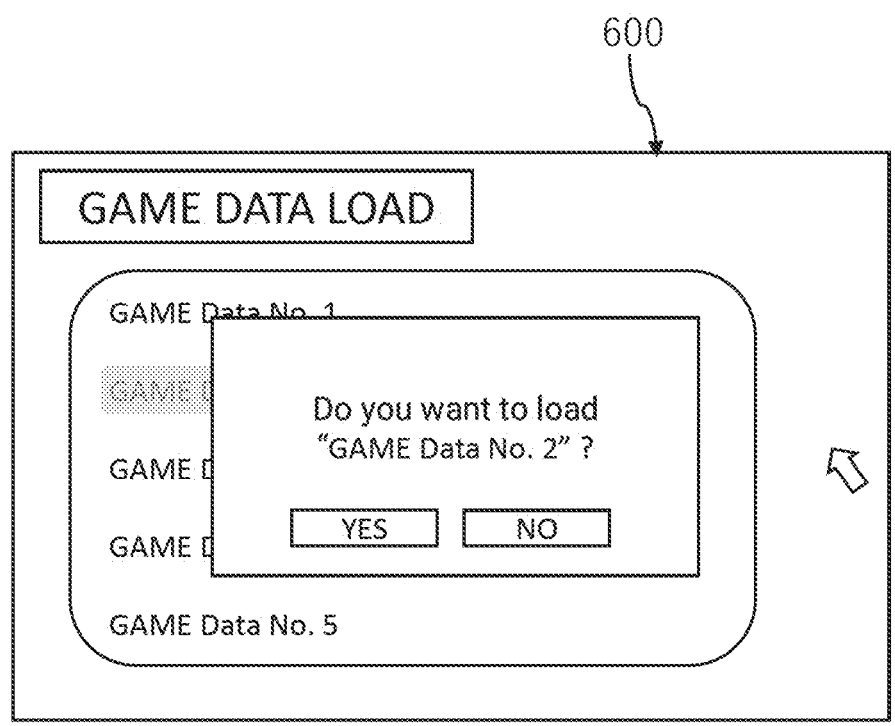
FIG. 5 is a schematic diagram illustrating a user terminal that displays a software window image including the plurality of software windows illustrated in FIG. 4.

Subsequently, the image processing unit 110 and processing relating to the image processing unit 110 are explained. FIG. 4 is a schematic diagram illustrating original window display including a plurality of software windows. FIG. 5 is a schematic diagram illustrating a display screen on a user terminal side that displays a plurality of software window images illustrated in FIG. 4.

As illustrated in FIG. 4, the software 150 may include a plurality of software windows 500 and 520. In this case, the image processing unit 110 executes predetermined image processing for causing the user terminal 900 to display, as one image, images of the plurality of software windows 500 and 520.

Note that, in general, the software window 500 includes a window region 502 and a client region 504. The window region 502 is a portion equivalent to a frame of a window. The client region 504 is equivalent to a region on the inner side of the window region 502.

In the following explanation, a procedure for distributing a plurality of software window images is explained together with processing by the image processing unit 110.

First, the image processing unit 110 acquires all of windows (software windows) included in software. When the image processing unit 110 acquires a plurality of software windows, the image processing unit 110 determines a software window having the largest size among the plurality of software windows as a main window.

Subsequently, the image processing unit 110 converts, according to necessity, a base point of position coordinates of the main window such that the main window is located in the center of a screen. Consequently, it is possible to prevent the main window from deviating from the screen. In this paragraph, the "screen" may be a virtual screen recognized by the software 150. The size of the screen may be determined by being input during execution of the software. The image processing unit 110 converts the base point of the position coordinates of the main window such that the main window is located in the center of the screen. However, not only this, but the base point of the position coordinates of the main window may be converted such that the main window does not deviate from the screen.

Subsequently, the image processing unit 110 sets the client region of the main window in an image acquisition region (a capture range).

Subsequently, the image processing unit 110 changes position coordinates of a sub-window other than the main window such that the sub-window is located on the inner side of the client region of the main window.

In a specific example, the image processing unit 110 changes the position coordinates of the sub-window to match the center of the sub-window with the center of the client region of the main window. When the sub-window protrudes further to the outer side than the client region of the main window irrespective of the change of the position coordinates, the image processing unit 110 may expand the image acquisition region (the capture range) by a protrusion amount of the sub-window.

The image processing unit 110 acquires image information of the above capture range as one image. Consequently, the image processing unit 110 acquires, as an image that should be distributed to the user terminal 900, image information in which the main window and the sub-window overlap each other.

The image distributing unit 120 may distribute the image processed by the image processing unit 110 to the user terminal 900. Consequently, an image 600 illustrated in FIG. 5 is displayed on the user terminal 900.

The processing explained above by the image processing unit 110 may be repeatedly performed at a predetermined time interval. Such a predetermined time interval may be, for example, in a range of 0.01 seconds to 1.00 seconds.

In the processing by the image processing unit 110 explained above, in principle, a non-client region of the main window is not distributed to the user terminal 900. Alternatively, the non-client region of the main window may also be distributed to the user terminal 900. However, the image processing unit 110 preferably sets only the client region of the main window as the image acquisition range to prevent both of a frame of the browser on the user terminal 900 side and an image of a frame of the window region of the main window from being displayed.

When the software 150 includes only one window, the image processing unit 110 may execute the same processing excluding the processing concerning the sub-window explained above. That is, the image processing unit 110 may specify one window included in the software 150 as the main window and preferably set the client region of the main window as the capture range.

With the information processing system 100 explained above, the user can remotely operate the software 150 from the Web browser of the user terminal 900. The user can operate the software according to event information involved in pointer operation or touch operation on a display screen distributed as image (moving image) information. Therefore, the user can operate the software without depending on a type, a version, and the like of an OS loaded on the user terminal 900.

If a platform such as the information processing system 100 explained in the embodiment is created, simply by inputting existing software to the information processing system 100 without altering the existing software, the user can execute the software. Accordingly, a manufacturer of the software does not need to alter the existing software according to the type, the version, and the like of the OS.

Second Embodiment

Figure 6:
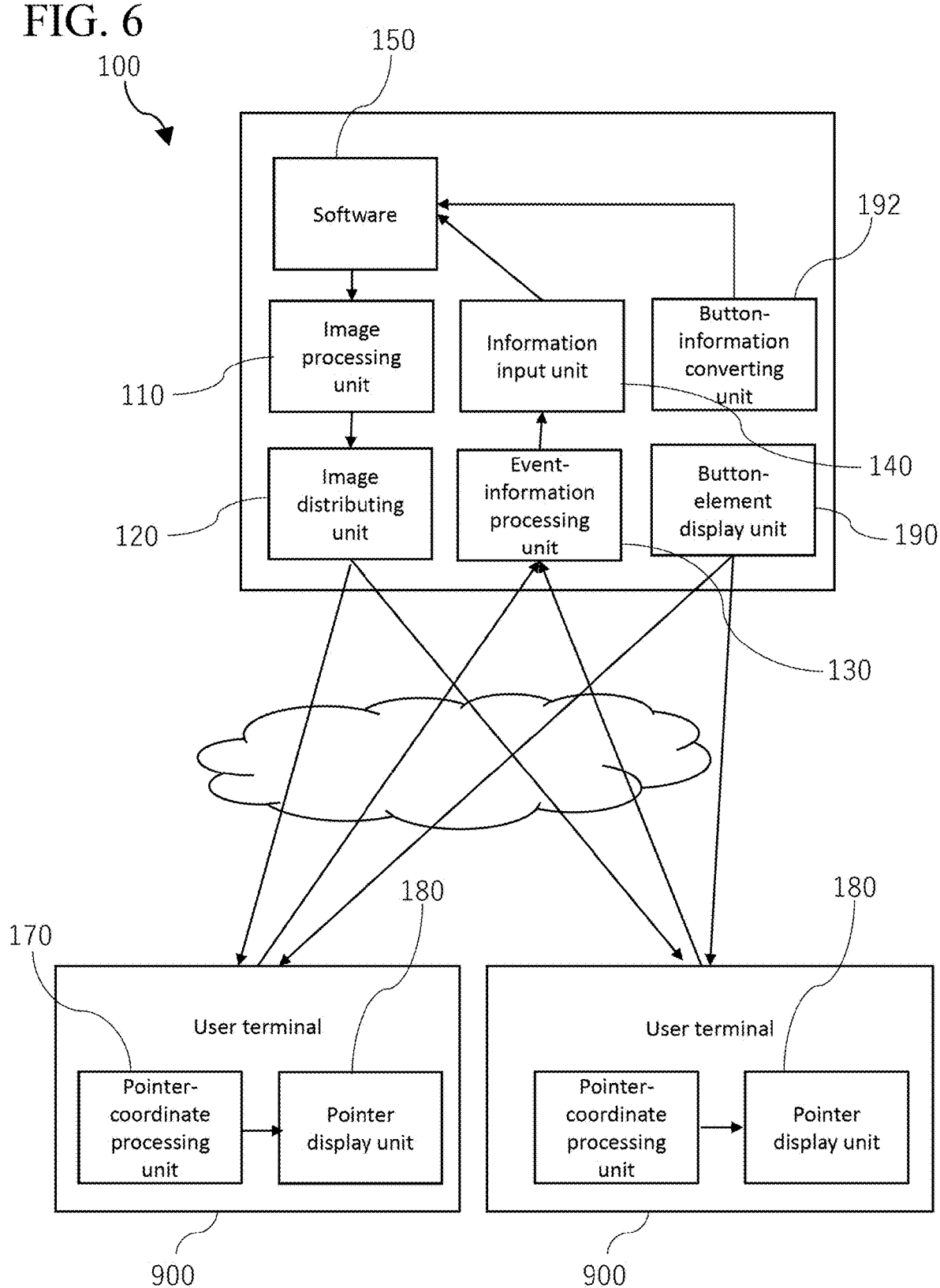
FIG. 6 is a block diagram illustrating the configuration of an information processing system in a second embodiment.
Figure 7:
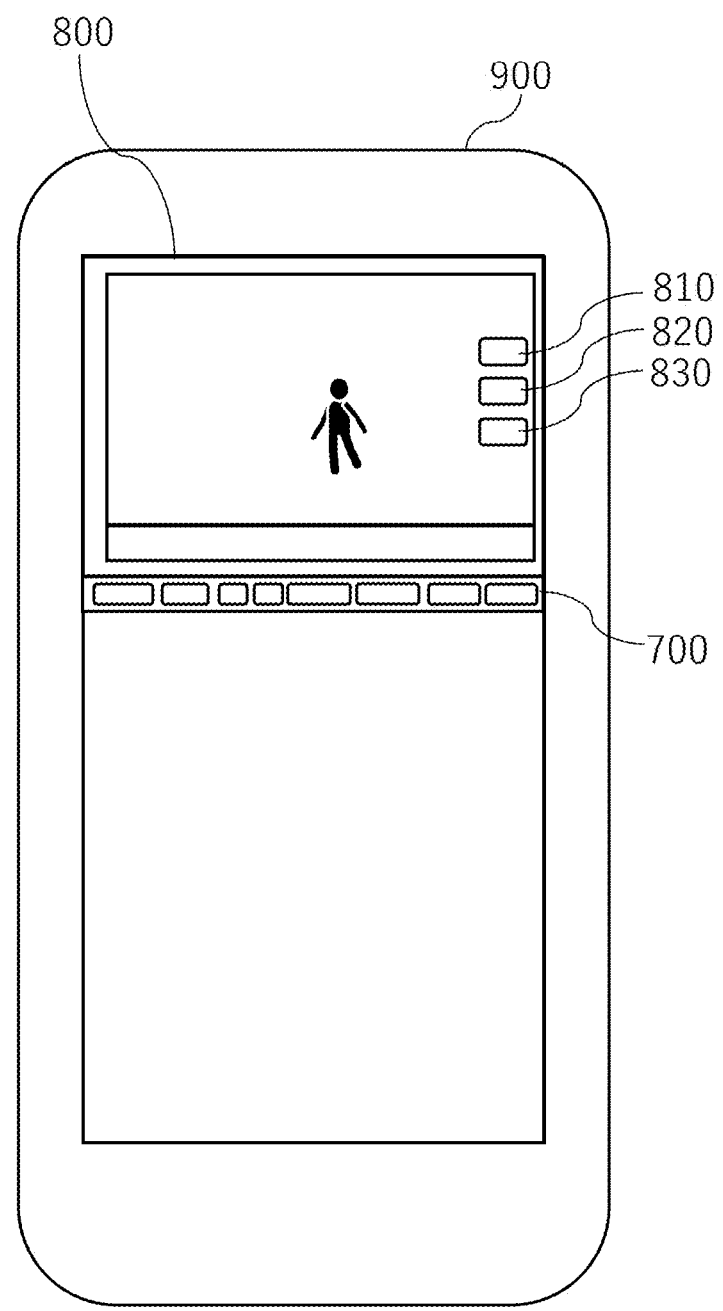
FIG. 7 is a schematic diagram illustrating a user terminal in a first mode.
Figure 8:
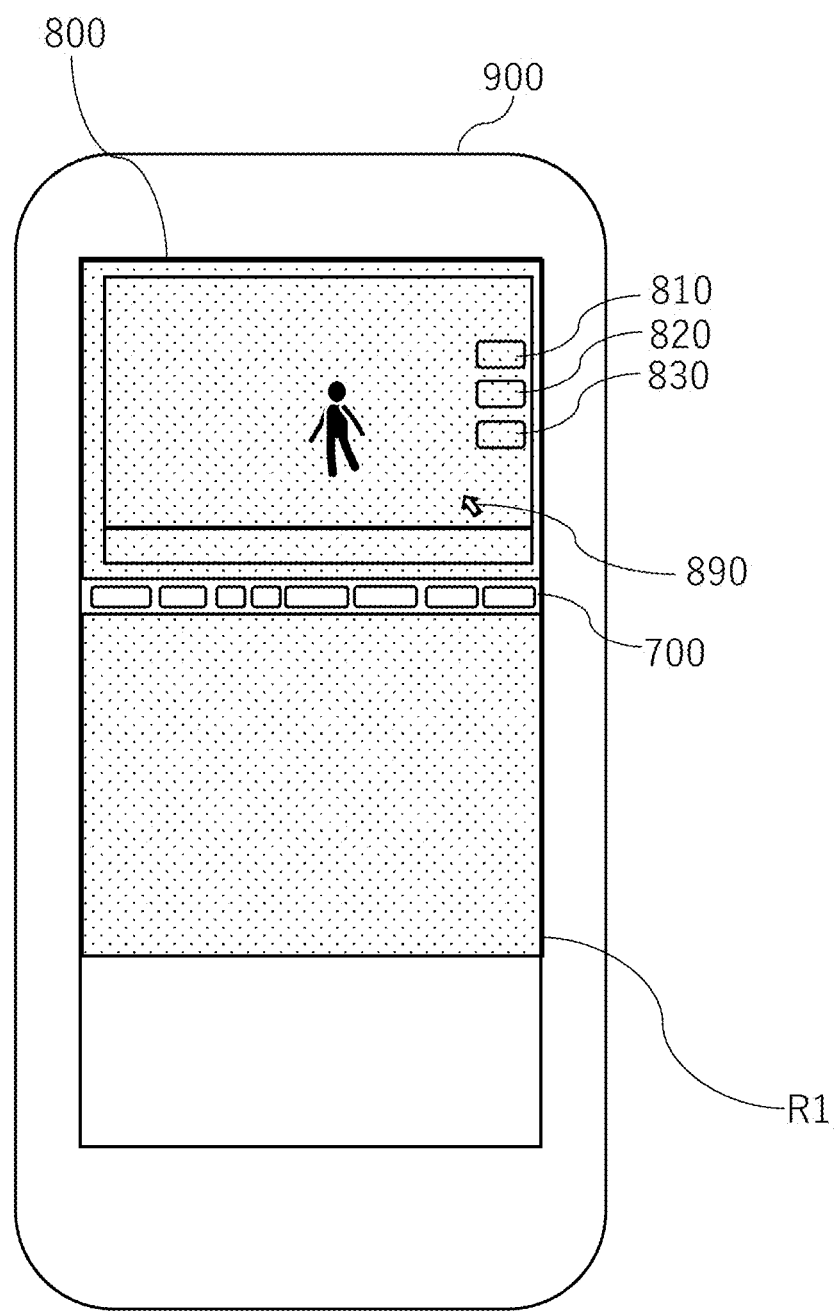
FIG. 8 is a schematic diagram illustrating the user terminal in a second mode.

FIG. 6 is a block diagram illustrating the configuration of an information processing system in a second embodiment. FIG. 7 is a schematic diagram illustrating a user terminal in a first mode. FIG. 8 is a schematic diagram of the user terminal in a second mode.

In the second embodiment, the same components as the components in the first embodiment are denoted by the same reference numerals and signs. Note that explanation about the same components as the components in the first embodiment is sometimes omitted.

In the second embodiment, the user terminal 900 (the computer) includes a display screen including a touch panel. In FIG. 7 and FIG. 8, the user terminal 900 is a smartphone but is not limited to this. In FIG. 7 and FIG. 8, note that the software window image explained above is displayed on the display screen including the touch panel.

In the second embodiment, the user terminal 900 is selectively switched to a first mode (FIG. 7) in which a pointer is not displayed and a second mode (FIG. 8) in which the pointer is displayed. The switching may be configured to be able to be performed by user setting by a not-illustrated selection button or the like.

Such switching may be realized by an application installed in the user terminal 900 or may be realized by a function loaded on the information processing system 100 on a network.

The first mode illustrated in FIG. 7 is a normal mode. The software window image is displayed on the display screen. As explained above, the user can remotely operate the software 150, which is executed by the information processing system 100, by performing tap operation, swipe operation, or the like of a region where an image is displayed, that is, a region of the touch panel.

Even when the user performs the tap operation, the swipe operation, or the like in a region on the outer side of the region where the software window image is displayed, the event-information processing unit 130 may convert the tap operation, the swipe operation, or the like into an input signal concerning operation of the software. Then, the information input unit 140 may input the input signal to the software 150.

Specifically, first, the event-information processing unit 130 receives event information generated by tap operation or swipe operation of the touch panel of the user terminal 900. The event-information processing unit 130 converts position coordinates included in the Web browser included in the event information based on a ratio of the resolution of the Web browser and the resolution of the software window as explained in the first embodiment.

When the converted position coordinates deviates from the region of the software window, the event-information processing unit 130 converts the event information into a predetermined input signal.

The predetermined input signal is preferably a signal unrelated to position coordinates of the software window. Examples of such an input signal include a keyboard signal. The predetermined input signal is preferably, in particular, an input signal that should be generated by an "Enter" button with a high frequency of use among keyboard signals.

In the above explanation, when the user performs the tap operation, the swipe operation, or the like in the region on the outer side of the region where the software window image is displayed, the event-information processing unit 130 performs the processing for converting the position coordinates. Alternatively, when the user performs the tap operation, the swipe operation, or the like in the region on the outer side of the region where the software window image is displayed, the user terminal 900 may convert event information generated according to the operation into the predetermined signal explained above and transmit the predetermined signal to the information processing system 100. In this case, a program for performing such processing may be provided in the user terminal 900 by being downloaded through a network or installed from a storage medium such as a CD-ROM.

Consequently, when the user performs operation, for example, tap operation of a region where the software window image is not displayed in the user terminal 900, processing of the software is advanced assuming that keyboard operation such as "Enter" is performed. Therefore, it is possible to improve operability in execution of the software.

The second mode illustrated in FIG. 8 is a mode for displaying, on the software window image, a pointer 890 representing an operation position. For this purpose, the information processing apparatus 100 may include a pointer-coordinate processing unit 170 that manages position coordinates of a pointer and a pointer display unit 180 that displays an image 890 of the pointer.

As illustrated in FIG. 8, the pointer-coordinate processing unit 170 and the pointer display unit 180 may be provided in the user terminal 900. In this case, the pointer-coordinate processing unit 170 and the pointer display unit 180 may be provided in the user terminal 900 by being downloaded through a network or installed from a storage medium such as a CD-ROM.

The software window image is displayed on only a part of the screen of the user terminal 900. On the other hand, a region where touch operation is possible in the touch panel (a region R1 to which a fill pattern is applied in FIG. 8) is different from the display region of the software window image.

Preferably, at least a part of the region R1 where the touch operation is possible is preferably present on the outer side of the display region of the software window image. In the example illustrated in FIG. 8, the region R1 where the touch operation is possible extends to the display region of the software window image and a region extending further to the lower side than the display region of the software window image.

The pointer-coordinate processing unit 170 may convert position coordinates where the image 890 of the pointer should be displayed, based on present position coordinates of the image 890 of the pointer and the event information (the position coordinates) generated by the touch operation in the touch panel.

The pointer-coordinate processing unit 170 preferably moves the position of the image 890 of the pointer based on the swipe operation on the touch panel of the user terminal 900. More specifically, the pointer-coordinate processing unit 170 may change the position of the pointer from the present position coordinates according to an amount of change of position coordinates of a touch position generated based on the swipe operation. A moving direction of the pointer is preferably the same direction as a moving direction of the swipe operation.

In the following explanation, processing for moving the image 890 of the pointer is explained more in detail.

First, the pointer-coordinate processing unit 170 periodically receives event information at a predetermined time interval. The predetermined time interval may be an interval of approximately 0.01 seconds to 1.00 seconds. The event information includes ON information or OFF information indicating whether the touch panel is touched and information concerning position coordinates representing a touch position in the ON information.

When receiving the ON information in succession, the pointer-coordinate processing unit 170 preferably calculates a difference between position coordinates representing touch positions. When the difference is equal to or more than predetermined pixels, the pointer-coordinate processing unit 170 determines that the swipe operation is performed. On the other hand, when the difference is less than the predetermined pixels, the pointer-coordinate processing unit 170 determines that touch is continued in the same position. The predetermined pixels may be, for example, 0 to 30 pixels.

When determining that the swipe operation is performed, the pointer-coordinate processing unit 170 generates a differential vector corresponding to a change in position coordinates in continuously received ON information, that is, directions and distances of the position coordinates. Note that the differential vector can be specified by two-dimensional numerical values. That is, if the change in the position coordinates in the continuously received ON information is 300 pixels in an X direction and 150 pixels in a Y direction, the differential vector is specified by (300, 150).

The pointer-coordinate processing unit 170 changes, based on the differential vector, the present position coordinates of the image 890 of the pointer stored in a storing unit. More specifically, the pointer-coordinate processing unit 170 may add the differential vector to the present position coordinates of the image 890 of the pointer.

The pointer display unit 180 displays the image 890 of the pointer on the browser of the user terminal 900 based on the position coordinates changed in this way. Note that the position coordinates of the image 890 of the pointer is preferably limited to coordinates in the display region where the software window image is displayed. That is, the image 890 of the pointer is preferably movable only in the display region where the software window image is displayed.

As explained above, when the region R1 where the touch operation is possible is different from the display region of the software window image, the user can operate the pointer while touching a region different from the display region of the image. That is, the user is capable of performing the pointer operation without hiding a displayed image with a finger. In this way, irrespective of the user terminal 900 including the touch panel that generally does not need to display an image of the pointer, by displaying the pointer 850, it is possible to perform operation of the software with pointer operation without hiding the image with a finger.

From such a viewpoint, the region R1 where touch operation is possible is preferably present further on the outer side than the display region of the software window image. Note that the region R1 where the touch operation is possible may overlap the display region where the software window image is displayed.

A moving distance of the position of the image 890 of the pointer may be the same as or may be longer or shorter than a moving distance by the swipe operation. An amount of change may acceleratingly change according to the magnitude of the moving distance. When both the moving distances are the same, the user may move the finger by a distance that the user desires to move the pointer. Therefore, the user can easily instinctively know how long the user should operate the pointer.

When the moving distance of the position of the image 890 of the pointer is longer than the moving distance by the swipe operation, the user may move the finger by a shorter distance. Therefore, the user can increase operation speed of the pointer.

When the moving distance of the position of the image 890 of the pointer is shorter than the moving distance by the swipe operation, the movement of the pointer is short even if the user moves the finger by a long distance. Therefore, it is easy to finely adjust the position of the pointer. This is particularly effective for a computer including a small screen like a smartphone.

The moving distance of the position of the pointer with respect to the moving distance by the swipe operation or the acceleration of the movement can be preferably switched by setting by the user. Such switching can be realized by processing for multiplying the differential vector by a predetermined value set by the user.

In the second mode in the second embodiment (see FIG. 8), the event-information processing unit 130 processes, as explained below, the event information generated by the touch operation performed by the user. In the second mode, the event-information processing unit 130 receives position coordinates of the pointer 890 when the touch operation is performed.

As in the first embodiment, the event-information processing unit 130 converts the position coordinates of the pointer 890 based on the ratio of the resolution of the browser of the user terminal 900 and the resolution of the software window. The information input unit 140 may input the position coordinates converted in this way to the software 150.

In the example explained above, the pointer-coordinate processing unit 170 and the pointer display unit 180 are provided in the user terminal 900. Alternatively, one or both of the pointer-coordinate processing unit 170 and the pointer display unit 180 may be provided in the information processing apparatus 100, that is, on the network. In this case, position coordinates where the image 890 of the pointer should be displayed may be managed on the network. In this case, the position coordinate where the image 890 of the pointer should be displayed can be changed by substantially the same method as the method explained above except that the event information generated by the swipe operation by the user is communicated via the network. The pointer display unit 180 may display the image 890 of the pointer based on the position coordinate managed on the network.

When the position coordinate where the image 890 of the pointer should be displayed is managed on the network, the position coordinate may be managed according to a position coordinate defined based on the resolution of the browser of the user terminal 900 or may be managed by a position coordinates defined based on the resolution of the software window. When the position coordinates where the image 890 of the pointer should be displayed is managed according to the position coordinates defined based on the resolution of the software window, the pointer-coordinate processing unit 170 may convert the position coordinates received from the user terminal 900 based on the ratio of the resolution of the browser of the user terminal 900 and the resolution of the software window like the event-information processing unit 130 in the first embodiment. In this case, when causing the user terminal 900 to display an image of the pointer, the pointer-coordinate processing unit 170 may generate position coordinates obtained by inversely converting the position coordinates defined based on the resolution of the software window with a ratio (a ratio opposite to the ratio at the conversion time) of the resolution of the browser and the resolution of the software window and display the image 890 of the pointer on the user terminal 900 based on the inversely converted position coordinates.

The image 890 of the pointer may be distributed from the information processing system 100 to be included in the software window image.

Note that a method of a computer performing the information processing explained in the first embodiment and the second embodiment is also included in the scope of the present invention. Further, a program for causing the computer to execute such a method is also included in the scope of the present invention.

Such a computer program can be stored in non-transitory computer readable media of various types and supplied to the computer. The non-transitory computer readable media include tangible storage media of various types.

Examples of the non-transitory computer readable media include a magnetic recording medium (for example a flexible disk, a magnetic tape, and a hard disk drive), a magneto-optical recording medium (for example, a magneto-optical disk), a CD-ROM (Read Only Memory), a CD-R, a CD-R/W, a semiconductor memory (for example, a mask ROM, a PROM (Programmable ROM), an EPROM (Erasable PROM), a flash ROM, and a RAM (random access memory)).

The program may be supplied to the computer by transitory computer readable media of various types. Example of the transitory computer readable media includes an electric signal, an optical signal, and an electromagnetic wave. The transitory computer readable media can supply the program to the computer via a wired communication path such as an electric wire and an optical fiber or a wireless communication path.

The information processing system explained above may include a control unit for controlling elements of the information processing system and processing and storing various data. The control unit may include a CPU (Central Processing Unit), a ROM (Read Only Memory), and a RAM (Random Access Memory). The CPU is an arithmetic unit that controls the information processing system. Details of the control may be equivalent to the various kinds of control explained in the embodiment. The ROM stores a program and the like for realizing various kinds of processing by the CPU. Such a program may be, for example, the program for executing the various kinds of control explained in the embodiments above. The RAM stores data necessary for the various kinds of processing by the CPU.

As explained above, the content of the present invention is disclosed through the embodiments. However, the statement and the drawings forming a part of this disclosure should not be understood as limiting the present invention. Various alternative embodiments, examples, and operation techniques become obvious to those skilled in the art from this disclosure. Therefore, note that the technical scope of the present invention is decided by only the matters to define the invention according to the claims reasonable from the above explanation.

For example, in the embodiments explained above, the software 150 is the pre-existing software originally operated on the computer on which the software is loaded. Alternatively, the software 150 may be software manufactured to be executed on the platform explained in the embodiments.

Alternatively, the software 150 may be software configured to be executable by a specific operating system (OS), for example, an OS of a specific type or version. In this case, the information processing system 100 may be configured to execute the software with an OS corresponding to the software 150. In this case, even if the OS of the user terminal 900 is not an OS of a specific type or version recommended by the software 150, the user can remotely execute the software 150 through the Web browser. In this case, the information processing system 100 may start the OS recommended by the software 150 and, then, execute the software 150 on the OS.

In the embodiments explained above, the technique for remotely executing the software 150 through the Web browser of the user terminal 900 is explained. The technique explained above can be used not only in the Web browser but also in any browser if the browser is capable of displaying an image (a moving image) distributed through a network.

This application claims priority based on Japanese Patent Application No. 2019-154154 filed on Aug. 26, 2019, the entire content of which is incorporated herein by reference.

INDUSTRIAL APPLICABILITY

According to the aspect explained above, it is possible to provide a mechanism that can more generally execute existing software without depending on a type, a version, and the like of an OS as much as possible.

The invention claimed is:

1. An information processing system including a computer that is capable of communicating with a user terminal and that executes software remotely operated from the user terminal, the information processing system comprising:
   an image processing unit that is configured to acquire an image of a window that is generated in said computer by an execution of the software; and
   an image distributing unit that is configured to display the image acquired by the image processing unit in a display region of a browser of the user terminal, wherein
   when a plurality of windows specified by the software are present, the image processing unit is configured to:
      determine, as a main window, a window having a largest size among the plurality of windows;
      set a region of the main window as an acquisition region for an image;
      change position coordinate of a sub-window such that the sub-window is located on an inner side of the main window; and
      acquire overlapped image of the main window and the sub-window in the acquisition region as one image after the change of the position coordinate of the sub-window.

2. The information processing system according to claim 1, wherein the software is configured to be remotely operable from the user terminal through the browser, and the software includes processing for requesting a computer, in which the software is installed, to display the window.

3. The information processing system according to claim 1, wherein the information processing system is configured to change position coordinate of the sub-window to match a center of the sub-window with a center of the main window.

4. The information processing system according to claim 1, further comprising:
   an event-information processing unit that converts event information generated by operation on the browser of the user terminal into information specified by the software; and
   an information input unit that inputs the information converted by the event-information processing unit to the software, wherein
   the event information includes first position information concerning position coordinates on the browser of the user terminal, and
   the event-information processing unit is configured to convert the first position information into second position information on the window based on a ratio of resolution of the browser and resolution of the window.

5. The information processing system according to claim 1, wherein
   the image distributing unit is configured to display an image in the display region defined by a part of a region where operation of a touch panel of the user terminal is possible, and
   the information processing system includes:
      a pointer display unit that is configured to display a pointer representing an operation position on the image displayed in the display region; and
      a pointer-coordinate processing unit that is configured to change position coordinates for displaying the pointer based on event information generated by the operation in the touch panel of the user terminal.

6. The information processing system according to claim 5, wherein the information processing system is selectively switchable to a first mode in which the pointer is not displayed and a second mode in which the pointer is displayed.

7. The information processing system according to claim 5, wherein a moving distance of the pointer is longer or shorter than a moving distance by swipe operation in the touch panel.

8. The information processing system according to claim 5, wherein a moving distance or acceleration of movement of a position of the pointer with respect to a moving distance by swipe operation in the touch panel can be switched by setting by a user.

9. The information processing system according to claim 5, wherein the information processing system is configured to convert the event information generated by the tap operation of the touch panel into an input signal that should be generated by an "Enter" button of a keyboard when tap operation of the touch panel is performed on an outer side of the display region.

10. The information processing system according to claim 1, wherein
    the browser is a Web browser, and
    the software is game software.

11. The information processing system according to claim 1, wherein
    the browser is a Web browser, and
    the information processing system further comprises:
       a button-element display unit that displays button element on an outer side of the display region, the button element being linked with a programming language operating on the Web browser;
       a button-information converting unit that is configured to convert event information generated by operation of the button-element display unit on the Web browser into an event signal generated by pressing of a predetermined button provided in a keyboard; and
       an input unit that is configured to input the event signal converted by the button-information converting unit to the software.

12. The information processing system according to claim 1, wherein
    the software is configured to be executable by a specific operating system, and
    the information processing system is configured to start the specific operating system on the computer and is configured to execute the software with the specific operating system corresponding to the software.

13. The information processing system according to claim 1, wherein the image distributing unit is further configured to display a pointer on the image displayed in the display region of the user terminal.

14. The information processing system according to claim 1, wherein the image distributing unit is further configured to display a button element in the display region of the user terminal.

15. The information processing system according to claim 14, wherein a size of the display region is received by the image distributing unit.

16. An information processing method comprising by a computer:
    an image processing step for acquiring an image of a window that is generated by in said computer by execution of software which is remotely operated from a user terminal; and
    an image distributing step for displaying the image acquired by the image processing step in a display region of a browser of the user terminal, wherein when a plurality of windows specified by the software are present, the image processing step comprises steps of:
  determining, as a main window, a window having a largest size among the plurality of windows,
  setting a region of the main window as an acquisition region for an image,
  changing position coordinates of a sub-window such that the sub-window is located on an inner side of the main window, and,
  acquiring overlapped image of the main window and the sub-window in the acquisition region as one image after the change of the position coordinates of the sub-window.

17. A non-transitory computer-readable storage medium storing a program for causing a computer to execute the information processing method according to claim 16.

18. The information processing method according to claim 16, wherein the image distributing step further comprises displaying a pointer on the image displayed in the display region of the user terminal.

19. The information processing method according to claim 16, wherein the image distributing step further comprises displaying a button element in the display region of the user terminal.

20. The information processing method according to claim 19, wherein the image distributing step further comprises receiving a size of the display region.

* * * * *